United States Patent [19]

Clyne et al.

[11] 4,347,892
[45] Sep. 7, 1982

[54] ENERGY STORAGE UNIT AND SYSTEM

[75] Inventors: Arthur J. Clyne, Alma; John E. Knarr, Lansing; Stanley Miller, Alma, all of Mich.

[73] Assignee: Energy Recycling Company of Michigan, Lansing, Mich.

[21] Appl. No.: 126,933

[22] Filed: Mar. 4, 1980

Related U.S. Application Data

[60] Continuation-in-part of Ser. No. 938,543, Aug. 31, 1978, which is a division of Ser. No. 773,714, Mar. 2, 1977, Pat. No. 4,127,161.

[51] Int. Cl.³ .............................................. F28D 17/00
[52] U.S. Cl. ....................................... 165/10; 165/76; 165/104.11; 126/436
[58] Field of Search ...................... 165/104 S, 143, 76, 165/104.11, 104.13, 10; 126/400, 436; 206/499; 220/23.4, 23.6

[56] References Cited

U.S. PATENT DOCUMENTS 3,029,596  4/1962  Hanold et al. .................. 126/400 X
4,154,222  5/1979  Yu ................................... 126/400 X

FOREIGN PATENT DOCUMENTS

398927  9/1933  United Kingdom ............ 165/104 S

Primary Examiner—Albert W. Davis
Attorney, Agent, or Firm—Griffin, Branigan & Butler

[57] ABSTRACT

A heat storage unit (100) in the form of a rectangular parallelepiped is provided with a removable closure element (104), and contains a plurality of removable closed plastic tubes (126) holding a heat storage substance, the tubes being laterally supported by adjacent tubes and longitudinally supported to be spaced from ends of the unit by grids (124a and b). A transfer fluid flows from one end of the unit to the other through spaces between the tubes. A heat storage system (FIGS. 4 or 5 for example) is conveniently custom built by attaching a plurality of the rectangular parallelepiped units to form a cluster of units. Each unit includes a special structural frame (106) to allow such attaching. The units contain heat storage substances of various adjustable melting temperatures, thereby providing for the storing of heat as the latent heat of fusion at several temperature levels.

16 Claims, 14 Drawing Figures

ENERGY STORAGE UNIT AND SYSTEM

BACKGROUND OF THE INVENTION

This is a continuation-in-part of application Ser. No. 938,543, filed Aug. 31, 1978, which, in turn, was a divisional application of Ser. No. 773,714 filed Mar. 2, 1977, now U.S. Pat. No. 4,127,161. The disclosures in these earlier applications and patent are hereby incorporated herein by reference.

Figure 1:
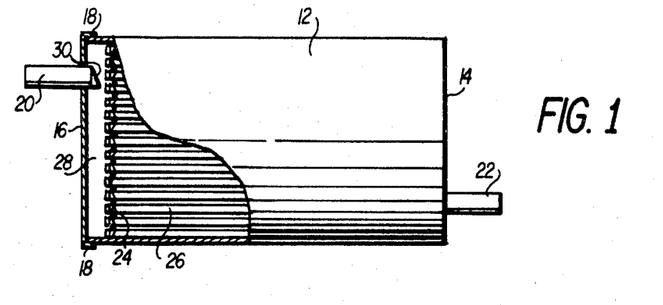
FIG. 1 is a side view, partially broken away, of a first-embodiment heat storage unit having some aspects of the invention.
Figure 2:
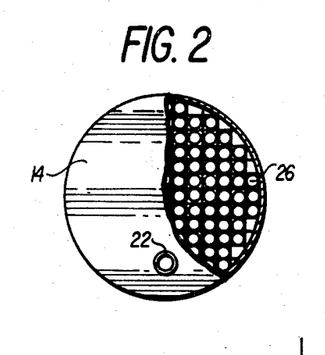
FIG. 2 is an end view, partially broken away, of the heat storage unit of FIG. 1.
Figure 3:
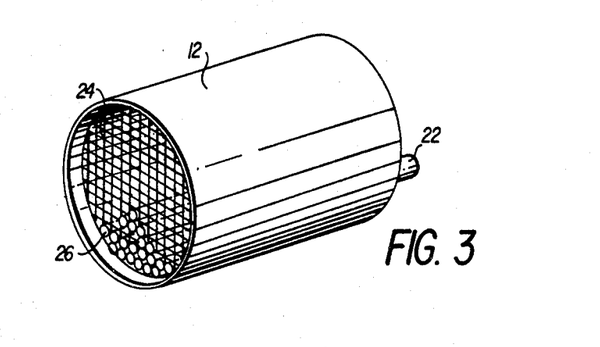
FIG. 3 is an isometric view of the heat storage unit of FIG. 1, partially filled with containers and with the end closure element removed.
Figure 4:
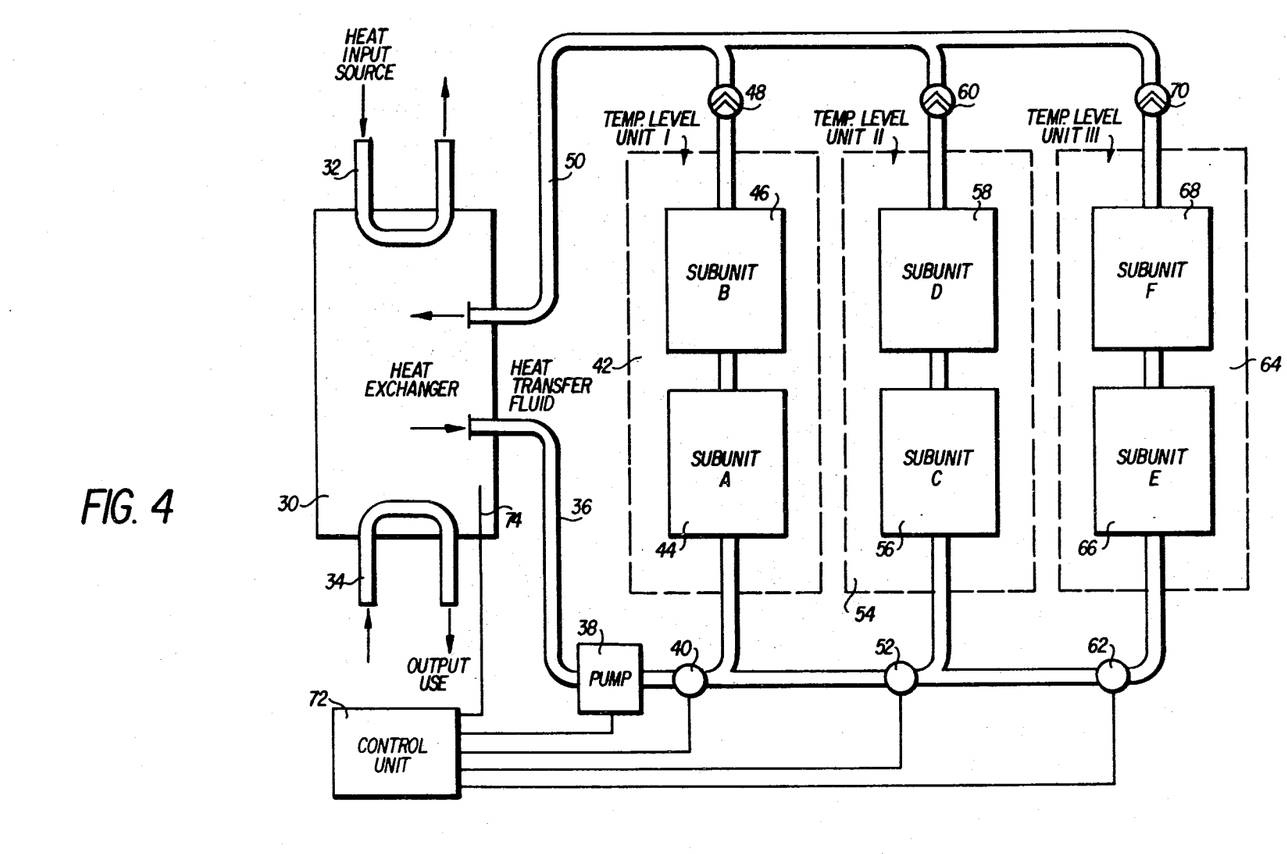
FIG. 4 is a fluid circuit diagram of a heat storage system in accordance with an aspect of the invention.
Figure 5:
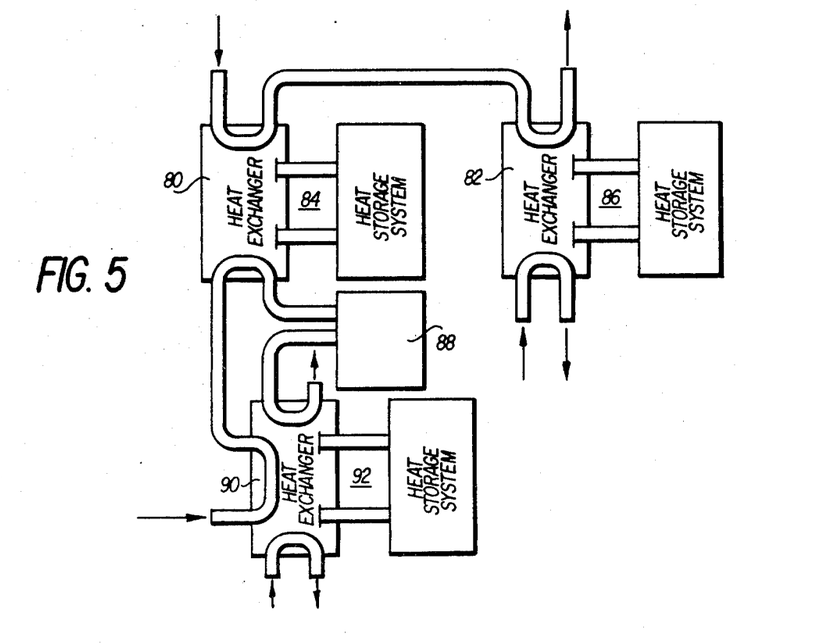
FIG. 5 shows a heat storage system combining several of the systems shown in FIG. 4.
Figure 6:
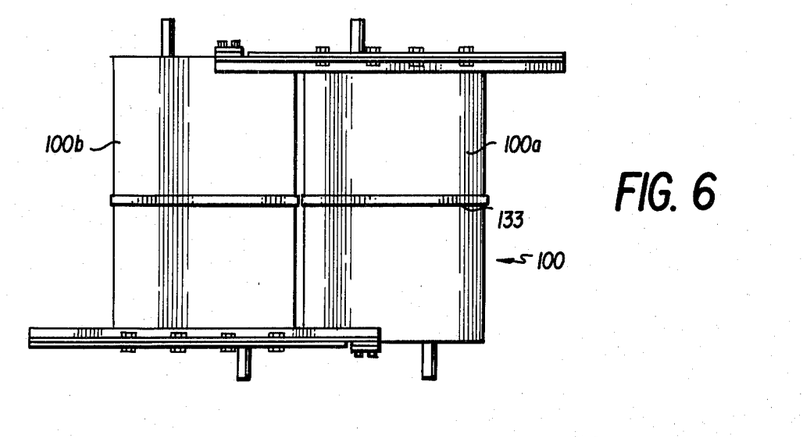
FIG. 6 is a side view of two fusion-type, second-embodiment, heat storage units clustered together.

The units and system disclosed in the above-mentioned applications and patent are depicted herein in FIGS. 1-5. FIGS. 4 and 5 schematically depict fusion-type heat storage systems and FIGS. 1-3 depict a heat storage unit that can be used in the systems of FIGS. 4 and 5.

Basically, the device of the instant invention is a heat storage unit corresponding to the heat storage unit of FIGS. 1-3, and also such a unit having significant modifications and improvements thereto which allow said heat storage unit to be used alone, or in clusters to form the systems of FIGS. 4 and 5.

More specifically, a difficulty with using prior-art heat storage units generally is in finding appropriate storage spaces for them. That is, heat storage units, as is well known, take up a significant amount of space which is often found to be undesirable by many property owners. Heat storage units are normally built in fixed sizes and shapes, and, therefore, to use these units one must find a space which accommodates them. It is an object of this invention to provide a heat storage system, and units for use therein, which can be easily custom built to various desirable capacities and shapes for fitting into unusually sized and shaped storage areas.

It is another object of this invention to provide heat storage units which can be easily stacked to form clusters of various sizes and shapes.

It is also an object of this invention to provide a fusion-type heat storage unit which is sufficiently strong and durable, but yet which is not unduly expensive to manufacture and and which can be relatively easily serviced.

It is a further object of this invention to provide a fusion-type heat storage unit which is unusually effective in storing heat and transferring it to a heat transfer fluid.

SUMMARY OF THE INVENTION

According to principles of this invention, a heat storage unit has a relatively thin sheet-metal main housing in the approximate shape of a right parallelepiped having a fluid inlet at one end, and an outlet at the opposite end. A plurality of elongated, plastic, cylindrically-shaped, heat storage substance containers are in each of said units. The containers are laterally supported against one another, and longitudinally supported within the housing, from ends thereof, by removable grid-like planar support elements.

The elongated, plastic, heat storage substance containers have round cross-sectional diameters of between one and two inches, with removable plastic caps. The containers are completely filled with heat storage substance with negligible air bubbles therein to absorb expansion.

Each of the units includes a frame for supporting the sheet-metal main housing and for allowing the unit to be attached to adjacent units for clustering units to form systems of various shapes and sizes.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE PREFERRED EMBODIMENTS

FIGS. 1-3 show a first embodiment basic heat storage unit of the invention. This unit comprises a cylindrical housing 12 having a fixed end 14 and a removable end closure 16. When in use, the end closure 16 is mounted to the cylinder 12 by fasteners 18. To prevent leakage of heat transfer fluid, a gasket is used between the closure 16 and the cylinder 12. A fluid flow inlet pipe 20 is fixed to the end closure 16 and an outlet pipe 22 is fixed to end plate 14. Although depicted in FIG. 1 with the inlet pipe 20 being positioned above the outlet pipe 22, in most cases the unit will be installed with the inlet pipe 20 being low and the outlet pipe 22 being high.

A planar support member, shown as screen 24 in FIG. 3 is provided adjacent and parallel to each end plate of the unit. These screens are fixed within the cylinder for supporting heat storage containers 26 spaced approximately two inches from the closed ends 14 and 16. These containers 26 are in the form of closed tubes. The tubes are individually removable from the unit and an access plug is provided at one end of each tube so that a heat storage substance contained therein can be easily replaced.

Suitable insulation, not shown, covers the entire cylinder housing 12.

Referring to FIG. 1, when in use, a heat transfer fluid will be directed from inlet pipe 20 into a space 28 by a fluid flow deflector 30. Deflector 30 has holes therein so that while some fluid is deflected downwardly, other fluid is diffused into the space above the deflector. The fluid will then pass through the screen 24 and flow around the heat storage tubes 26 toward outlet pipe 22. It should be noted that in this embodiment the screen 24 serves the dual purpose of supporting the heat storage tubes and diffusing the heat transfer fluid. This is a major difference between this first embodiment and a second embodiment (FIGS. 6-12) described hereinafter.

A transfer fluid passes through the cylindrical housing 12 transfering heat to and from the storage substance in the tube containers 26, thereby melting and freezing the substance. In this respect, heat is stored as latent heat of fusion in the substance until a cooler heat transfer fluid flows through the system. At such time, the heat storage substance will solidify, transfering the heat of fusion into the heat transfer fluid.

Types of fusion-type heat storage substances and transfer fluid are discussed in U.S. Pat. No. 4,127,161. Many additional substances and fluids are also available.

Referring now to FIG. 4, a preferred storage system which may use a number of the units shown in FIGS. 1-3, as well as the units shown in FIGS. 6-12, will be described.

The reference numerals of FIG. 4 are the same as those of U.S. Pat. No. 4,127,161 and the elements indicated thereby in the drawing are fully defined in that patent. These reference numerals will only be used to describe the operation of the FIG. 4 system.

To understand the operation of the system in FIG. 4, first assume that the heat transfer fluid in heat exchanger 30 is cool and that no heat is stored in the system. At this point, control unit 72 will act to close all valves 40, 52 and 62 and shut off pump 38, thereby preventing heat transfer fluid flow through pipe 36 of the system. With an input of heat from pipe 32 greater than the output through pipe 34, the temperature of heat transfer fluid in the heat exchanger 30 will increase. As this temperature reaches a predetermined level and before it approaches the melting temperature of heat storage substance found in a unit 42, the valve 40 wll be opened and pump 38 will be turned on to cause a flow of heat transfer fluid through the unit 42. As the transfer fluid heats up beyond the melting point of the storage substance found transferred from the fluid into the substance, thereby melting the substance. Heat will thus be stored within the substance as latent heat of fusion. When the storage substance in both subunits 44 and 46 has completely melted, these units will be completely charged.

So long as the temperature of the heat transfer fluid remains at or above the melting temperature of unit 42, valve 40 will remain open. If the heat transfer fluid temperature continues to increase, valve 52 will open as the temperature approaches the melting temperature of the unit 54. Unit 54, and subunits 56 and 58, will charge in the same manner as did unit 42.

Similarly, valve 62 will open as the temperature of transfer fluid approaches the melting temperature of unit 64 in subunit 66 and 68.

Describing the discharge of the system, heat may be extracted from the storage system automatically without changing the controls of valves 40, 52 and 62. As the output requirement of heat from heat exchanger 30 exceeds the input, the temperature of the heat transfer fluid will tend to decrease. As the temperature drops below the melting temperature of the substance in unit 64, tht substance will solidify, thereby releasing the stored heat of fusion. Once the substance in unit 64 has completely solidified, the temperature of heat transfer fluid will continue to drop and valve 62 will automatically close at a predetermined temperature level. Heat transfer fluid will, however, continue to flow through units 42 and 54. When the temperature drops below the melting temperature of unit 54, the heat storage substance of that unit will begin to solidify, releasing the heat of fusion.

Once the substance in unit 54 has completely solidified, the temperature of the heat transfer fluid will steadily drop to the temperature of unit 42 and valve 52 will thus be turned off. Finally, so long as the heat output from the heat exchanger 30 exceeds the input, unit 42 will discharge.

Check valves 48, 60 and 70 prevent backward flow of heat transfer fluid.

Each of the subunits 44, 46 etc. comprises one of the units 12 depicted in FIGS. 1-3, or one of the units depicted in FIGS. 6-12 herein below described. These units can be used as building blocks in various size and configured systems. As shown in FIG. 5, heat from a single heat source may be transferred into two heat exchangers 80 and 82 in heat storage systems 84 and 86. Heat storage system 84 might store at a very high temperature level for use in a high temperature application 88. Application 88 may be, for example, a heat pump absorption type air conditioner or a commercial laundry system. Heat storage system 86 would have a lesser maximum temperature capacity and could be used for lower temperature systems, as for example, domestic hot water taps.

The discharge water from laundry system 88 will be water still at a very high temperature, the heat of which is ordinarily lost. In the system shown the discharge is passed through a third heat exchanger 90 of a third heat storage system 92. The heat extracted from the discharge could be stored and used to preheat cold water which enters heat exchanger 80 or for additional applications as for example, to supplement the output from heat exchanger 82.

In addition to many other highly beneficial features, the heat storage unit alternate embodiment depicted in FIGS. 6-12 has the particular benefit of conveniently allowing the use thereof as building blocks to build heat storage systems of the types depicted in FIGS. 4 and 5, for example.

Figure 7:
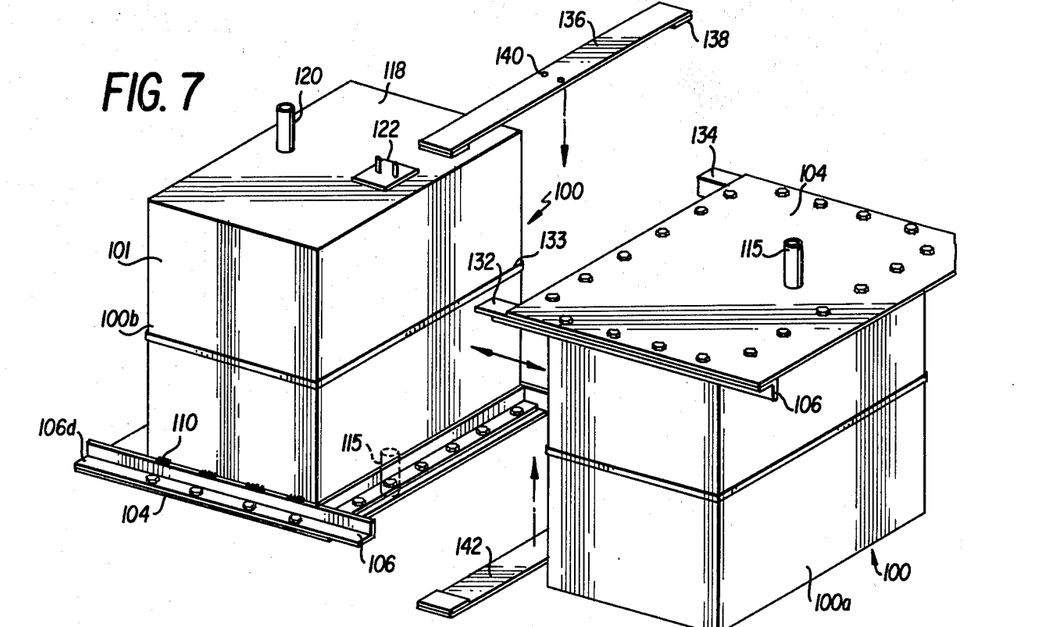
FIG. 7 is an isometric exploded view of the structure of FIG. 6.
Figures 8, 9A:
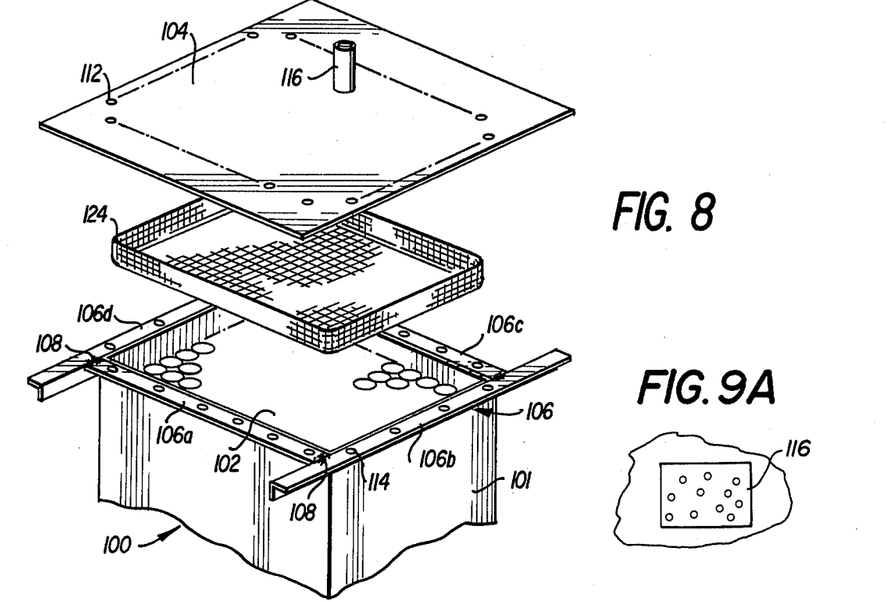
FIG. 8 is an isometric exploded view depicting in some detail the closure-element end of a fusion-type heat storage unit of FIGS. 6 and 7.
FIG. 9A is a segmented view taken on line 9A—9A in FIG. 9.
Figure 9:
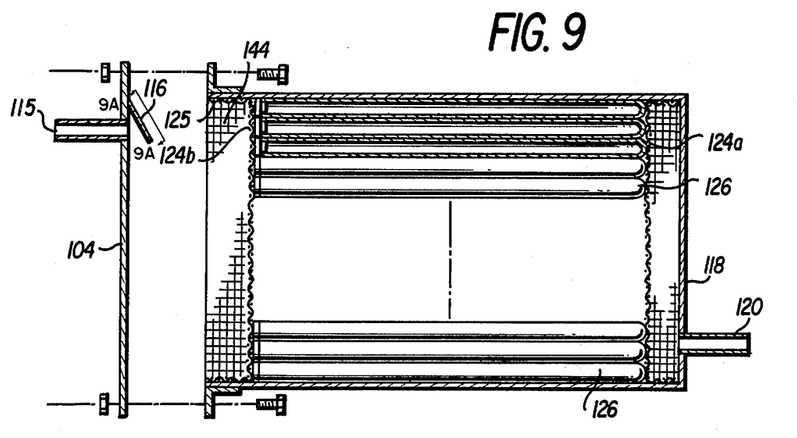
FIG. 9 is an exploded, side, sectional, view of a fusion-type heat storage unit of FIGS. 6, 7, and 8.
Figure 10:
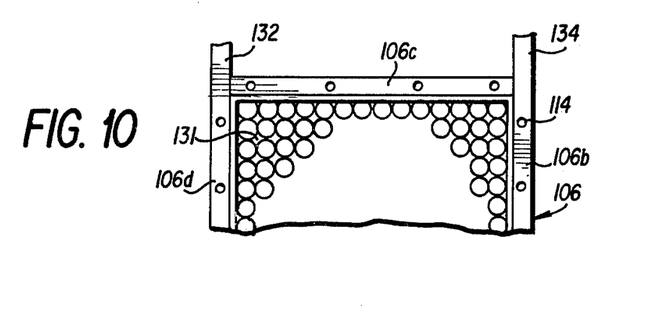
FIG. 10 is an end view of the heat storage unit of FIGS. 6-9 with a cover element removed therefrom.
Figure 11:
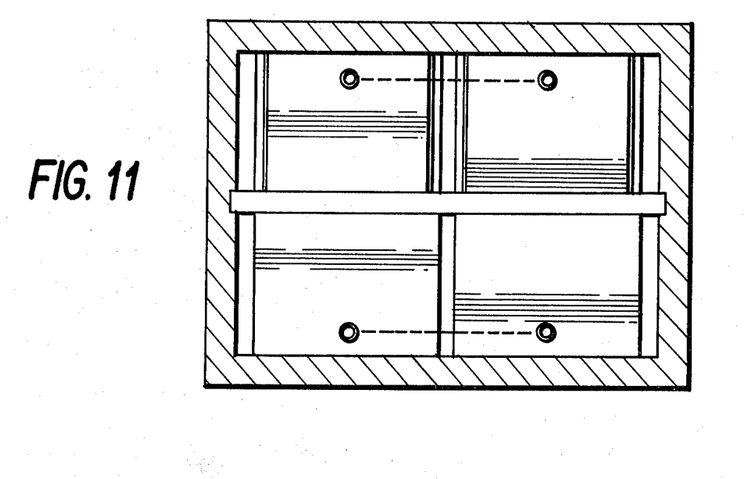
FIG. 11 is an end, partially-sectional view of a cluster of four heat storage units of FIGS. 6-10 with insulation therearound.

The fusion-type heat storage unit 100 has a main housing 101 that is in the shape of a right parallelpiped. With reference to FIGS. 8-10, a first end of the main housing 101 defines an opening 102 which can be closed by a closure element 104. Welded about the open end 102 of the main housing 101 is an L-bracket frame 106. Welds 108 at the contact areas of frame members 106a-d rigidly form a rectangularly shaped opening for receiving the open end of the housing 101, providing support for the housing 101, and providing the use of a gasket to seal against the closure element 104. The housing 101, is, in turn, welded to the frame members 106a–d with a fillet weld all around at 110 (FIG. 7). With regard to support for the housing 101, for economical reasons, the housing 101 is constructed of approximately 24 gauge (1/32 inch) sheet metal and requires the support of the frame 106 at its open end.

The cover 104, which is similarly constructed of sheet metal, is screwed, or bolted, to the frame 106, with an appropriate seal and gasket therebetween, at holes 112 and 114. The closure element 104 has an inlet pipe 115 and a perforate deflector baffle 116 (FIG. 9) attached thereto.

The closed end 118 of the housing 101 has mounted thereon an outlet pipe 120 for allowing the flow of transfer fluid from the housing 101. In addition, mounted on the closed end 118 are externally-protruding threaded bolts 112 (FIG. 7), the purpose of which will be described below.

The housing 101 of the storage unit 100 has mounted therein, spaced from respective ends by around two inches, grids, or screens, 124a and b (FIGS. 8 and 9) having openings 126 therein. The grid 124b is removable. In the depicted embodiment, the spacing of the grids is obtained by bending the edges of the grids to form legs, or spacers 125. Mounted between the grids 124a and b are fusion-substance-containing tubes 126. These tubes are round in cross-section and are constructed of an inexpensive high-temperature resistant, plastic having a high resistance to penetration, such as polypropylene. These tubes range in diameters from one inch to two inches. They should not be larger than two inches so that the distance between their centers and exterior surfaces is at no time more than one inch, thereby allowing fusion to take place at a higher level of efficiency. The tubes range in thickness from 50 mils to 65 mils depending on the diameters thereof, the largest thickness corresponding to the largest diameter and the smallest corresponding to the smallest diameter. The thickness/diameter ratio should be in the range of from 50 to 32.5 mils/inch. The time that it takes to charge and discharge the unit is dependent on the size of the tubes 126. in this respect, the smaller the diameter and thickness of the tubes, the faster the charge and discharge. Thus, the system can be designed to produce a charge/-discharge rate.

Figure 13:
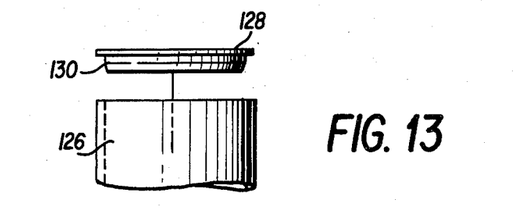
FIG. 13 is an exploded view of the cap end of a heat storage tube of this invention.

Each of the tubes 126 has a plastic end cap 128 as is depicted in FIG. 13. The end cap 128 has a plug portion 130 which is sized to tightly fit into the interior of the tubes 126. The end cap 128 is constructed of a plastic such as polypropylene, the same as the tubes 126 and are heat, or ultrasonic welded to the tubes 126 once the tubes are fully charged, the caps are removed for servicing the tubes by cutting the plastic weld. In this respect, the tubes 126 should be completely filled with the heat storage substance without leaving a significant air bubble therein, for reasons to be described below. To accomplish this it is useful to fill the tubes 126 in a vacuum, or at leat a partial vacuum.

The tubes 126 are supported, rather snugly, laterally within the housing 101 by one another, that is, they rest against one another. They are only supported longitudinally by the grids 124a and b. This is a significant departure from the arrangement of the FIGS. 1–3 embodiment. Since the tubes 126 are round, there are natural spaces 131 formed between the tubes to allow flow of heat transfer fluid therethrough. A significant feature of this invention is that the heat storage unit 100 itself functions as a valve to properly control the flow of heat from it both during charging and discharging thereof. In this respect, the heat storage fusion material, or substance, has the property of expanding and contracting on its heating and cooling. The polypropylene plastic tubes 126 are highly resistant to penetration and will withstand repeated cycles of contraction and expansion of the heat storage fusion material. It can be appreciated that the tubes 126 should be virtually totally evacuated of air when they are filled with heat storage fusion material to prevent the force of expansion and contraction of the fusion material within the tubes from being absorbed by the air. The force of expansion and contraction of the fusion material is, therefore, directed on the plastic tube walls 126, thereby reducing and expanding the size of the tubes 126, allowing more or less fluid to flow through the heat storge unit 100, automatically. When the tubes 126 enlarge, they press together, thereby decreasing the amount of external surface exposed to the transfer fluid. When they contract, the opposite is true. Flattening of the tubes 126, upon contraction, increases the space between them thereby allowing a greater volume of heat transfer fluid to be contained within the battery during the period in which the cells are contracting and cooling. This permits a greater exposure of heat transfer fluid to the cells during this period of lower thermal emission, which is desirble. The converse is also true. When the tubes 126 are expanded, there is less space in the heat storage unit 100 for heat transfer fluid. A lesser volume of heat transfer fluid is exposed to the tubes. During this period of initial thermal emission, less heat transfer fluid is required to convey a like amount of heat from the unit.

Thus, the unit tends to accept, when charging, and give off, when discharging, a fairly uniform amount of heat, because of its inherent structure, wherein the tubes 126 are supported by one another.

A plastic, such as polypropylene, works as the material for the tubes 126 so long as the operating temperature is less than 190° F. However, other expandable, highly-resistant-to-internal-fatigue, temperature-resistant material will also work for these and other temperatures.

A metal band 133 is wrapped about the waists of the housings 101 to prevent them from bowing outwardly when they are filled with a transfer medium, and thereby to maintain a constant cross-sectional area around the tubes 126.

Discussing next the structure, and method, for installing the heat storage units 100, two opposite angle iron elements 106b and d extend outwardly beyond the angle iron 106c to form extension elements 132 and 134 (FIG. 7). These extension pieces are used for clustering units 100 in the manner depicted in FIGS. 6 and 7. In this respect, heat storage units 100a and b are nested together along the sides at which extension elements 132 and 134 are located, with adjacent units being oriented in opposite directions, so that there are extension elements 132 and 134 at both ends. Retainer plates 136, having firm, but relatively soft, compression members 38 at the ends thereof, are bolted to the threaded bolts 122 through holes 140 in the retainer plates 136. In this regard, when the retainer plates 136 are tightened onto the threaded bolts 122 by nuts (not shown) the compression members 138 press against the extensions 132 and 134 to hold the heat storage units 100a and b together. In another embodiment the compression members 138 are not used, but rather the retainer plates 136 are bolted to the extensions 132 and 134.

Figure 12:
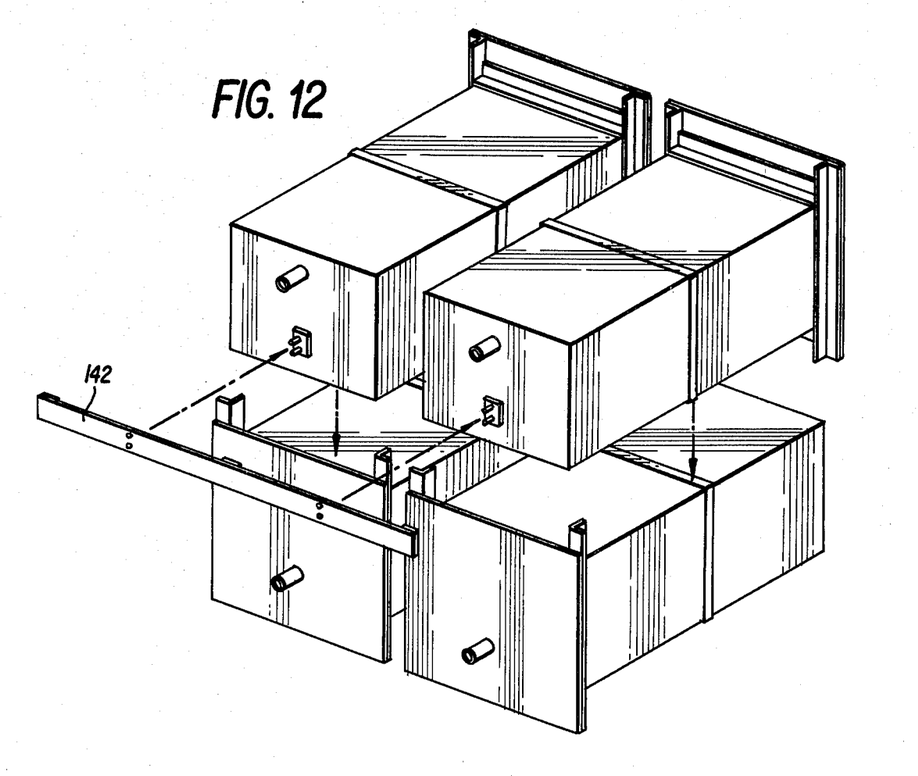
FIG. 12 is an isometric, exploded, view of the cluster of four heat storage units of FIG. 11, without insulation.

FIG. 12 depicts an embodiment wherein normal retainer plates 136 are replaced by spacer-type retainer plates 142 for holding two clusters of two units together, thereby forming a cluster of four units. In this manner, the units can be clustered together into variously shaped configurations to fit various storage areas of building. Again compression plates could be replaced by bolts.

In the preferred embodiment, each one of the heat storage units 100 is approximately 2.5 feet in width and height, and 5 feet in length. The units are capable of storing 11,000 BTU's per cubic foot of unit capacity at a temperature differential of 150° F.

In operation, a building which is being converted to a solar energy system, for example, is analyzed to determine the required storage capacity of heat, in btu's. Once this has been determined, it is determined how many heat storage units 100 such a heat storage system will require. It is understood that the heat storage system can be of the configurations depicted in FIGS. 4 and 5 herein, or of other configurations. Once the number of heat storage units is known, the building is examined to find convenient locations for the units. Upon finding storage area(s) within the building, the heat storage units 100 are clustered together by using the frame extensions 132 and 134 and the retainer plates and spacer-type retainer plates 136 and 142 into the necessary configurations for fitting into the storage area(s). Depending upon access to the storage area(s), such custom building of a heat-storage-unit cluster(s) can be done in the storage area(s) themselves, or at a factory.

It is understood that the heat storage units 100 used in making such cluster(s) already contain tubes 126 charged with fusion-type heat storage substances. That is, these tubes were charged and the end caps 128 thereof were welded to the tubes, and the tubes were positioned between the grids 124a and b within the housings 101 at a factory. The tubes could be installed, however, at the installation site, and in fact, this heat storage system is serviced by changing these tubes periodically, should the fusion-type heat storage substances lose their effectiveness.

Returning to the operation of the overall device, once the heat storage units 100 have been installed in the cluster of a desired shape, they are connected in a system, such as the system of FIG. 4, with each one of the units 100 forming a subunit a-f of FIG. 4, for example. The entire cluster is covered with an insulation having an outer vinyl skin.

It will be appreciated by those skilled in the art that the rectangular configuration of the heat storage units 100 enables them to be stacked in variously required shapes and sizes. Also, when thusly stacked, these units can be easily connected in parallel, or in series, or as otherwise desired, to form systems such as the system of FIG. 4 herein.

The grids 124a and b provide longitudinal support for the tubes 126 so that the tubes do not move longitudinally when the units are turned on end. On the other hand, the grids 124a and b allow fluid flow between the tubes 126 so that the heat-transfer fluid transfers heat to the fusion-type heat storage substance located within the tubes 126. Also, by mounting the tubes 126 longitudinally between the grids, while supporting them laterally by each other, a higher density of tubes can be put in the housings 101 than if the tubes had been supported laterally by the grids. This configuration also provides automatic valving to produce a more uniform heat flow as was previously explained.

In addition, the tubes 126, being of an inexpensive plastic, are relatively inexpensive to manufacture, but yet are durable and are sufficiently effective in transferring heat. The perforate baffle 116 located at the inlet 115 insures that transfer fluid entering into a vestibule space 144 (FIG. 9), created by the grid 124b, is evenly distributed throughout the tubes 126.

The system of this invention is extremely versatile and can be utilized in new construction or for retrofit use in buildings already constructed. In this respect, this system allows clusters to be fabricated of various shapes, sizes or capacities. Further, by allowing the tubes 126, and the heat storge medium therein, to be easily changed, the system can be made to operate at any selected temperature. Further, since the cells can be changed at any time, either before or after installation, field service requirements are fully accommodated, and a possibility of changing the overall system is always present. The combination of thin sheet metal housing with rigid frames allows a light yet strudy and relatively inexpensive construction.

While the invention has been particularly shown and described with reference to preferred embodiments thereof, it will be understood by those skilled in the art that various changes in form and detail may be made therein without departing from the spirit and scope of the invention as defined in the appended claims.

I claim:

1. A heat storage unit of the type in which heat from a heat transfer fluid is transferred to a heat storage substance when the transfer fluid temperature is greater than the melting temperature of the substance such that heat is stored in the substance as heat of fusion and wherein heat is transferred from said substance to a heat transfer fluid when the transfer fluid temperature is less than the melting temperature of the substance, said heat storage unit comprising a substantially closed housing having first and second ends; a closure element forming substantially one entire end thereof; a fluid inlet and outlet at said respective first and second ends; at least two planar support means having a plurality of holes therein mounted within said housing adjacent to, and spaced from, each end of said housing; and a plurality of elongated, cylindrically-shaped, heat storage substance containers in said housing, said containers being longitudinally supported within said housing by said two planar support means, and laterally supported by one another; said unit including laterally extending supports for attaching said heat storage unit to an adjacent heat storage unit and a compression retainer plate engageable with lateral supports of an adjacent heat storage unit.

2. The heat storage unit of claim 1 wherein each elongated storage container is a closed tube, said tubes and said heat storage substance being designed to reduce and expand thereby allowing more or less fluid to flow through the heat storage unit as a function of temperature.

3. The heat storage unit of claim 2 wherein said planar support members are screens spaced from the nearest ends of said unit, said screens having holes therein which are too small to allow said containers to pass therethrough.

4. The heat storage unit of claim 2 or claim 3 wherein each heat storage container tube has a closure element at one end thereof.

5. The heat storage unit of claim 4 wherein each heat storage container tube is constructed mainly of plastic.

6. The heat storage unit of claim 5 wherein said plastic is polypropelene.

7. The heat storage unit of claim 2 wherein each heat storage container tube is constructed mainly of plastic.

8. The heat storage unit of claim 7 wherein said heat storage container tubes have diameters within the range of from within one to two inches.

9. The heat storage unit of claim 1 wherein said heat storage unit includes a removable closure element at the end thereof for servicing said heat-storage-substance containers.

10. The heat storage unit of claim 1 wherein is further included a baffle located at the fluid inlet thereof for dispersing fluid entering said heat storage unit.

11. The heat storage unit of claim 10, wherein said baffle is perforate.

12. The heat storage unit of claim 1 wherein said closed housing is in the approximate shape of a right parallelepiped.

13. A heat storage system of the type in which heat from heat transfer fluid is transferred to a heat storaage substance when the transfer fluid temperature is greater than the melting temperature of the substance such that heat is stored in the substance as heat of fusion and wherein heat is transferred from said substance to the transfer fluid when the transfer fluid temperature is less than the melting temperature of the substance, said heat storage system comprising a plurality of selectively interengaged heat storage units, each of said heat storage units including a substantially closed housing having first and second ends; a closure element forming substantially an entire end thereof; a fluid inlet and outlet at respective ends; at least two planar support means having a plurality of holes therein mounted within said housing adjacent to, but spaced from, each end of said housing; and a plurality of elongated, cylindrically-shaped heat storage substance containers in said housing, said containers being longitudinally supported in said housing by two planar support means; said heat storage unit further including a rectangular frame extending about each of said units, said rectangular frame engaing said adjacent units to hold said units together.

14. A heat storage system as in claim 13 wherein each of said units is in the approximate shape of a right parallelepiped.

15. A heat storage system as in claim 13 wherein at least one of said planar support means is removable for removing said cylindrically-shaped heat storage substance containers.

16. A heat storage system as in claim 13 wherein said cluster of heat storage units is covered with insulation.

* * * * *